US008442536B2

(12) United States Patent
Yang et al.

(10) Patent No.: US 8,442,536 B2
(45) Date of Patent: *May 14, 2013

(54) ROBUST AND FAST INTER-EBS HANDOFF MECHANISM

(75) Inventors: Jin Yang, Orinda, CA (US); Pingping Zong, Randolph, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,542

(22) Filed: Apr. 30, 2012

(65) Prior Publication Data

US 2012/0269174 A1    Oct. 25, 2012

Related U.S. Application Data

(63) Continuation of application No. 12/235,019, filed on Sep. 22, 2008, now Pat. No. 8,190,158.

(51) Int. Cl.
*H04W 36/00* (2009.01)

(52) U.S. Cl.
USPC .................. 455/436; 455/440; 370/331

(58) Field of Classification Search .......... 455/436, 455/440; 370/331
See application file for complete search history.

(56) References Cited

U.S. PATENT DOCUMENTS

| 5,509,051 | A | 4/1996 | Barnett et al. |
| 5,722,072 | A | 2/1998 | Crichton et al. |
| 6,119,005 | A | 9/2000 | Smolik |
| 6,564,057 | B1 | 5/2003 | Chun et al. |
| 2004/0125769 | A1 | 7/2004 | Vare |
| 2004/0233871 | A1 * | 11/2004 | Seki et al. ............. 370/331 |
| 2004/0235478 | A1 | 11/2004 | Linquist et al. |
| 2008/0240039 | A1 | 10/2008 | Parekh et al. |
| 2008/0247360 | A1 | 10/2008 | Tinnakornsrisuphap et al. |
| 2008/0261598 | A1 | 10/2008 | Tinnakornsrisuphap et al. |

FOREIGN PATENT DOCUMENTS

| WO | WO-99/59253 | 11/1999 |
| WO | WO-2007/149509 | 12/2007 |
| WO | WO-2008/054072 | 5/2008 |
| WO | WO-2008/118994 | 10/2008 |
| WO | WO-2009/067494 | 5/2009 |

OTHER PUBLICATIONS

International Search Report and Written Opinion of the International Searching Authority issued in International Patent Application No. PCT/US2009/052260 dated Sep. 22, 2009.
Entire Prosecution of U.S. Appl. No. 12/235,019 to Jin Yang et al. filed Sep. 22, 2008 entitled "Robust and Fast Inter-EBS Handoff Mechanism."

* cited by examiner

*Primary Examiner* — Nimesh Patel

(57) ABSTRACT

A communications system provides a robust and fast inter-base station handoff mechanism, e.g. for networks using Enhanced Base Stations (EBS) equipment. A method for connecting a mobile device to a destination base station in the wireless communications system, may include steps of receiving a mobile device measurement report, transferring context information from a serving base station to possible target base stations, and receiving admission control information from possible target base stations. A priority list of the possible target base stations is calculated and sent to the mobile device. The mobile device connects to one or more of possible target base stations according to the priority list. The method may also entail receiving a release message from one of the possible target base stations to which the mobile device has successfully established a wireless connection, to allow release of resources of the prior serving base station.

22 Claims, 8 Drawing Sheets

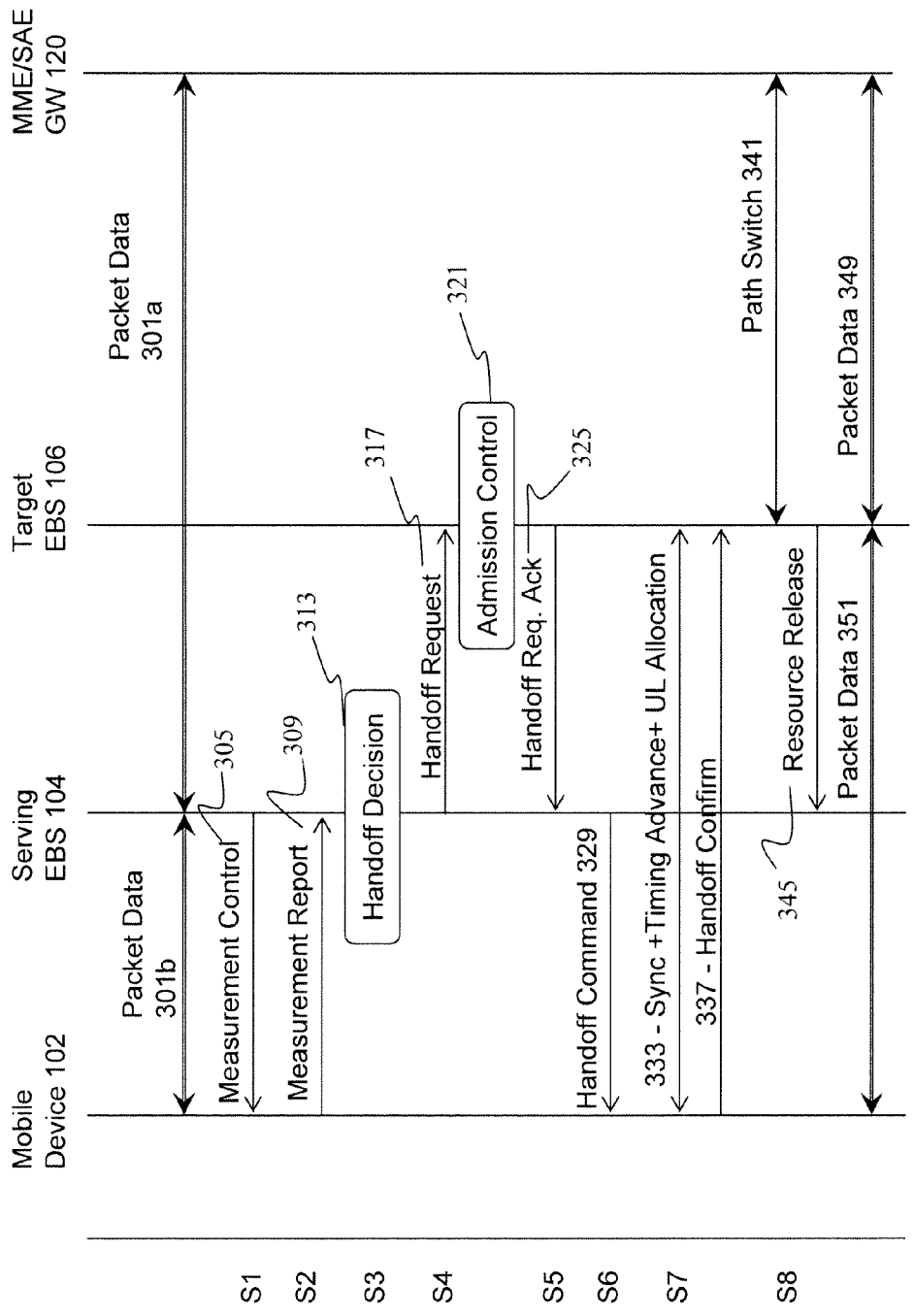
FIG. 3 – Prior Art

ROBUST AND FAST INTER-EBS HANDOFF MECHANISM

RELATED APPLICATIONS

This application is a continuation of U.S. application Ser. No. 12/235,019 filed on Sep. 22, 2008, issued as U.S. Pat. No. 8,190,158, the disclosure of which is incorporated herein by reference in its entirety.

BACKGROUND

In recent years, many mobile service providers have been upgrading wireless networks to support packet-switched data communications services, which extend the common data communication capabilities of the wired domain to the wireless mobile domain. A popular advantage of wireless communications is the freedom of mobility. To support mobile communication, the wireless networks perform a function called "handoff" or "handover". Handoff is the process by which elements of a mobile network pass a cellular phone conversation or data session from one radio channel in one cell to another radio channel in another cell. It is performed so quickly that callers do not notice. Handoff, unlike roaming, involves moving an active call from one radio to another radio. Roaming involves registering for service/access through different locations on various regional networks, as a mobile station user moves.

In Code Division Multiple Access (CDMA) cellular telecommunication systems, a handoff is usually accomplished via a "soft handoff" between sectors or from one base station to another base station. In a soft handoff between base stations, for example, the mobile station is in communication with more than one base station simultaneously, and thus the mobile station performs a "make before break" transition from one base station to another base station. The soft handoff is possible because in CDMA cellular telecommunication systems, numerous mobile stations communicate with each base station on the same frequency channel, each mobile station having a unique spreading code or offset thereof for distinguishing the information signals broadcast by the numerous mobile stations. Thus, when a mobile station moves from one CDMA cell to another CDMA cell, the same frequency is used in each CDMA cell and the unique spreading code identifies the mobile station to the new base station.

A "hard handoff" occurs when it becomes necessary to handoff between systems, e.g. between systems of different service providers or between systems using different technologies (e.g. between CDMA and Advanced Mobile Phone System (AMPS), Time Division Multiple Access (TDMA) or Global System for Mobile communications (GSM) systems). The hard handoff is a "break before make" connection. The hard handoff may be necessary because the available frequency channels or the encoding technologies used in the two adjoining systems differ, and thus when a mobile station moves from one to another, a new frequency channel or coding technique must be implemented.

However, next generation radio access networks are moving away from "soft handoff" in order to more efficiently utilize radio resources. The Next Generation Network (NGN) will be dominated by asynchronous radio access networks providing only hard handoff. This makes fast and robust handoff across various radio access points extremely important.

Furthermore, current inter-Enhanced Base Station (EBS) handoff in Long Term Evolution (LTE) and inter-Access Point (AP) handoff in Worldwide Interoperability for Microwave Access (WiMAX) only defines and prepares one potential Target EBS. However, for example, when only one potential Target EBS is prepared, latency in handoff can result. In LTE and WiMAX, when a handoff is prepared, only one potential Target EBS is prepared for the handoff. Afterwards, if a signal interruption results between the Target EBS and the mobile station such that the mobile station cannot connect to the Target EBS, then the mobile station will remain connected to the Serving EBS. However, since only one potential Target EBS was prepared, then the Serving EBS will have to prepare another Target EBS for a handoff. This preparation takes time and results in the mobile station remaining connected to the Serving EBS longer than needed. This further consumes system resources. This results in system latency and poor handoff performance. However, the current LTE and WiMAX approaches result in poor handoff performance.

Additionally, Ultra Mobile Broadband (UMB) is a synchronized network which stores dual radio stacks at both Serving and Target EBS, which results in complicated terminal equipment.

Hence a need exists for a means to more efficiently determine and transfer call context information to multiple EBSs to ensure a fast and robust handoff mechanism that minimizes latency, handoff interruption and outage performance without actively involving multiple EBSs.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is a signal flow diagram of the prior art handoff mechanism used in an EBS.

DETAILED DESCRIPTION OF PREFERRED EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
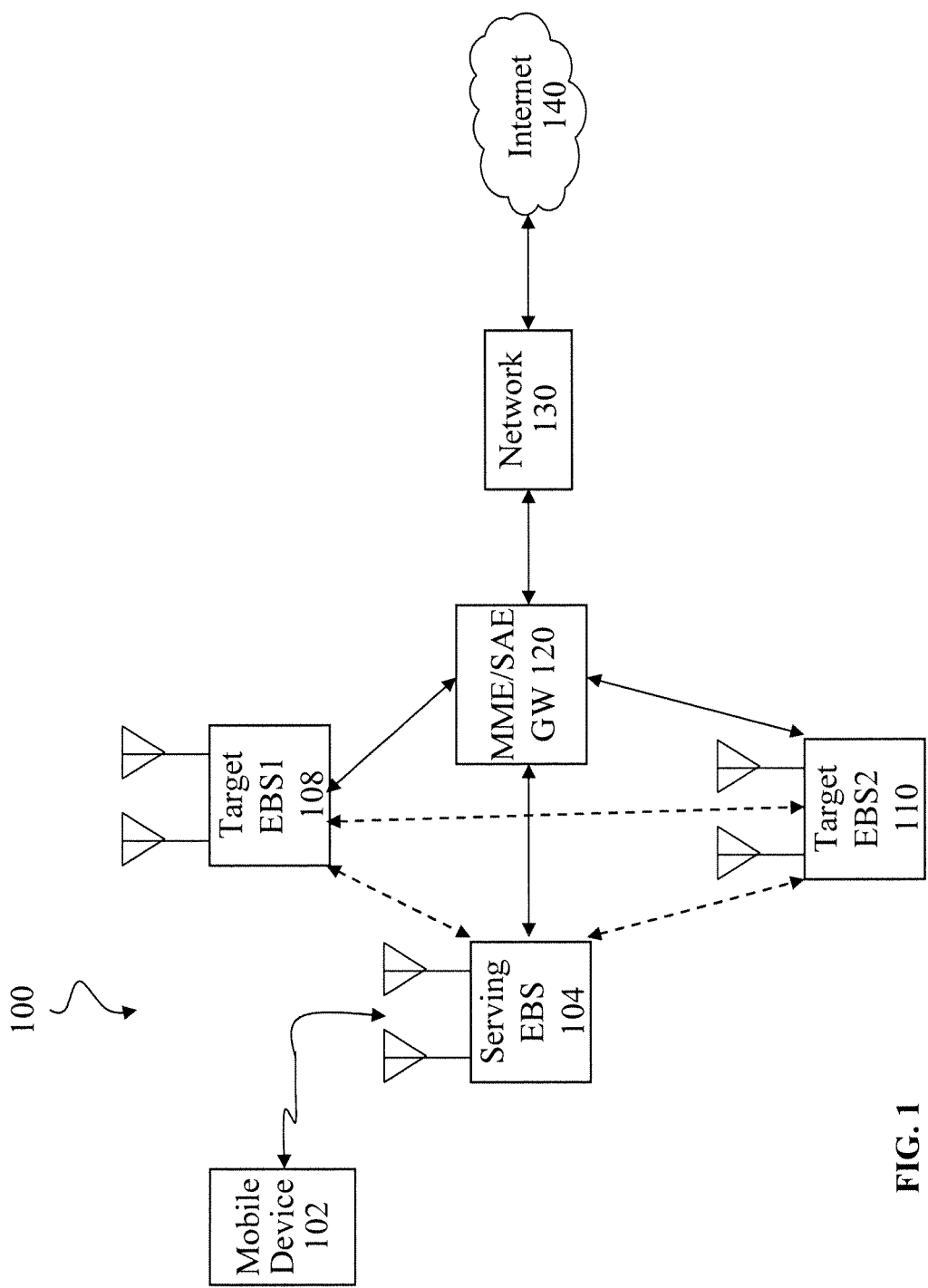
FIG. 1 is an exemplary wireless network for providing high speed voice and data services.

Reference now is made in detail to the examples illustrated in the accompanying drawings and discussed below. FIG. 1 illustrates a functional block diagram of an exemplary wireless network 100 for providing high speed voice and data services, which may implement handoff in accord with the present concepts. The illustrated network 100, for example, involves 4G radio access networks and technology that enables a Mobile Device 102 to access the Network 130 and/or the Internet 140 over the air via a Serving EBS 104.

In FIG. 1, Mobile Device 102 can connect to any of the EBSs (Serving EBS 104, Target EBS1 108 and Target EBS2 110) in order to make a call (i.e. voice) or to transfer/receive data. Serving EBS 104, Target EBS1 108 and/or Target EBS2 110 provide wireless access points to Mobility Management Entity/System Architecture Evolution GateWay (MME/SAE GW) 120, Network 130 and Internet 140. In FIG. 1, Mobile Device 102 is connected to Serving EBS 104 via the air. Serving EBS 104 is connected to Network 130 and Internet 140 via MME/SAE GW 120. As a result, Mobile Device 102 can complete a call (i.e. voice) with other devices connected to Network 130 and/or Internet 140. Furthermore, Mobile Device 102 can transfer/receive data to any other devices attached to Network 130 and/or Internet 140. Target EBS1 108 and Target EBS2 110 are alternative cellular communications towers that are connected to MME/SAE GW 120, Network 130 and Internet 140. Therefore, Mobile Device 102 also can connect to MME/SAE GW 120 via use of Target EBS1 108 and Target EBS2 110. In FIG. 1, if it is more feasible for Mobile Device 102 to be connected to a different EBS (Target EBS1 108 and Target EBS2 110), then a handoff may result. This may occur for a number of different reasons, for example, Mobile Device 102 may have repositioned itself to be located in a position closer to a different EBS, the Serving EBS 104 may be supporting a number of other mobile devices resulting in congestion at Serving EBS 104. Regardless of the reason for the handoff, Serving EBS 104 will communicate with alternative EBSs (Target EBS1 108 and Target EBS2 110) via interfaces between EBSs (dashed lines in FIG. 1) and/or MME/SAE GW 120. The alternative EBSs (Target EBS1 108 and Target EBS2 110) will update the Serving EBS 104 of their ability to support Mobile Device 102 and also include other information that Serving EBS 104 may utilize in order to make a handoff decision. Once a handoff decision has been made by Serving EBS 104, then Serving EBS 104 will coordinate with Mobile Device 102 and the alternative EBSs to ensure a connection can be made between Mobile Device 102 and the alternative EBSs. Once the handoff connection is completed, then the Serving EBS 104 will be released from its connection with Mobile Device 102 and the new Serving EBS will coordinate with MME/SAE GW 120 the reallocation of system resources from the handoff.

Figure 2:
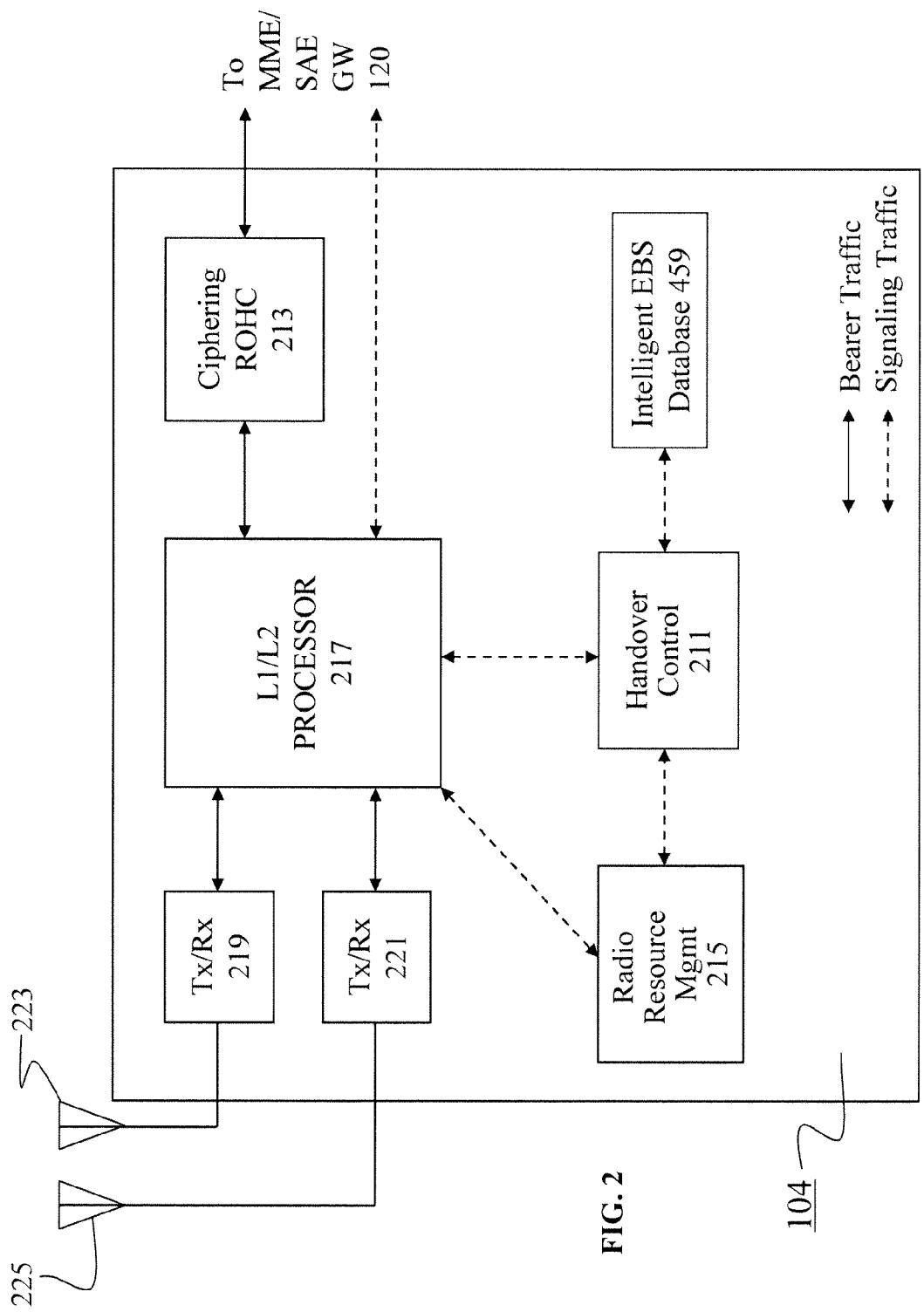
FIG. 2 is an exemplary block diagram of an EBS that implements the handoff mechanism of the present disclosure.

FIG. 2 is a functional block diagram of an exemplary EBS 104 for providing high speed data services over the air, which implements handoff in accord with the present concepts. The illustrated EBS 104, for example, involves 4G radio access networks and technology. Furthermore, while this exemplary embodiment provides the details on the inner-workings of the Serving EBS 104, it is understood that each EBS in the wireless network 100 incorporates elements similar to or the same as those shown in the functional block diagram of Serving EBS 104 shown in FIG. 2.

The Serving EBS 104 receives and transmits RF signals via Antennas 225 and 223. The RF signals are processed by Transmitter (Tx)/Receiver (Rx) elements 219 and 221. Tx/Rx elements 219 and 221 perform signal analysis and processing including upconverting/downconverting of the data signal, amplification, filtering, etc.

Layer 1/Layer 2 Processor 217 (L1/L2 Processor 217) performs multiplexing/de-multiplexing upper layer packets onto/from physical channels. L1/L2 Processor 217 includes Physical Layer processing (PHY), Media Access Control (MAC) and Radio Link Control (RLC). The RLC is responsible for the segmentation of IP packets, retransmission of erroneously received packets, and in-sequence delivery of packets to upper layers. The MAC layer provides addressing and channel access control mechanisms.

Handover Control 211 controls the mechanics of the actual handoff process. Handover Control 211 communicates with the other units contained within Serving EBS 104 to ensure that the handoff process is performed correctly. Therefore, various signaling parameters are involved. The signaling performed in the embodiments discussed in FIGS. 4-7 and certain aspects of the Ranking Matrix 463 are performed by Handoff Control 211. Handoff Control 211 interacts with an Intelligent EBS Database 459 (discussed below) in order to properly control the handoff. The Intelligent EBS Database 459 contains information on all of the neighboring cell sites (EBSs) in the wireless network 100. The control path functions are performed by Intelligent EBS Database 459, Handover Control 211, and Radio Resource Mgmt 215. Radio Resource Mgmt 215 performs Radio Bearer Control, Radio Admission Control, and the dynamic allocation of resources to Mobile Devices bi-directionally. Radio Resource Mgmt 215 may also include the Handover Control 211 functions.

Ciphering Robust Header Compression (ROHC) 213 performs encryption/decryption and Robust Header Compression. Furthermore, Ciphering ROHC 213 may also compress packets received from the MME/SAE GW 120 and forward the compressed data to L1/L2 Processor 217. Ciphering ROHC 213 is performed in order to compress Internet Protocol (IP), User Datagram Protocol (UDP), Real-time Transport Protocol (RTP), and Transmission Control Protocol (TCP) headers of internet packets destined for downstream transmission over the air to mobile devices served by the Serving EBS 104. ROHC performs well over wireless communications links where the packet loss rate may be high. Encryption/decryption is performed in order to ensure security of the transmitted/received data. The packet data from SAE GW (shown as dashed line/"Signaling Traffic" in FIG. 2) is ciphered and compressed at Ciphering ROHC 213 and transmitted to L1/L2 Processor 217. The control data (shown as solid line/"Bearer Traffic" in FIG. 2) bypasses Ciphering ROHC 213 and is directly connected to L1/L2 Processor 217.

To appreciate the improvement(s) provided by the present implementation of the handoff process, it may be helpful first to consider a typical process for transferring a communications session from one EBS to another EBS without the present enhancements. For that purpose, FIG. 3 is an exemplary call flow diagram for the prior art, when a Mobile Device 102 is connected to a Serving EBS 104 and the Mobile Device 102 is handed off to a Target EBS 106. Prior to the handoff, Mobile Device 102 is connected to the Serving EBS 104 and is capable of transferring Packet Data 301a and 301b to and/or from the rest of the network (MME/SAE GW 120 and Network 130) via the Serving EBS 104.

The Serving EBS 104 configures the Mobile Device Measurement Control Procedures 305 in order to obtain a measurement report 309 from the Mobile Device 102. Hence, in the example the Mobile Device 102 receives the measurement control procedures and command at 305 from the Serving EBS 104 and subsequently sends a measurement report 309 of the surrounding EBS signal strengths, as measured by the Mobile Device 102, to the Serving EBS 104. The measurement report 309 can be sent either periodically or by a triggered event that is configured by the network. In one embodiment, the measurement report 309 is a Radio Frequency (RF) signal strength measurement as measured by Mobile Device 102.

Upon receiving the measurement report 309, the Serving EBS 104 makes a Handoff Decision 313 to handoff the Mobile Device 102 to another EBS. For this purpose, the Serving EBS 104 determines the Target EBS 106 based on the measurement report 309 and other EBS's loading conditions, the previous HO statistics, etc. Afterwards, the Serving EBS 104 sends a Handoff Request 317 to the one identified Target EBS 206. The Handoff Request 317 contains context information of the Mobile Device 102. However, if the Target EBS 106 does not receive the Handoff Request 317, then no handoff will occur. Furthermore, an idle to active transition can occur, which results in handoff preparation latency.

The Target EBS 106 performs Admission Control 321 in order to gauge available network resources and sends a Handoff Request Acknowledgement 325 back to the Serving EBS 104 (assuming network resources are available). Furthermore, the Target EBS 106 stores the Mobile Device 102 context information and reserves Layer 1/Layer 2 (L1/L2) resources in order to assist with the handoff. In one exemplary embodiment, the L1/L2 resources include a Cell Radio Network Temporary Identifier (CRNTI).

The Serving EBS 104 receives the Handoff Request Acknowledgement 325 from the Target EBS 106, and subsequently directs the Mobile Device 102 to handoff to the Target EBS 206 via a Handoff Command message 329.

The Mobile Device 102 receives the Handoff Command message 329 from the Serving EBS 104, and the Mobile Device 102 synchronizes with the Target EBS 106 via Sync+Timing Advance UL Allocation message 333. Sync+Timing Advance UL Allocation message 333 also allows the Target EBS 206 to assign an uplink allocation and a timing advance to the Mobile Device 102.

Afterwards, the Mobile Device 102 sends a Handoff Confirm message 337 to the Target EBS 106 to indicate the completion of the handoff procedure.

The Target EBS 106 performs a Path Switch Procedure 341 to update the MME/SAE GW 120 of the handoff. After the Path Switch Procedure 341 is completed, the Target EBS 206 sends a Resource Release Message 345 to the Serving EBS 104 to trigger the release of the system resources previously used by the Mobile Device 102 at the Serving EBS 104.

As a result of the handoff, Mobile Device 102 is connected to the Target EBS 106; and packet data is transferred with MME/SAE GW 120 via Packet Data messages 349 and 351.

Figure 4A:
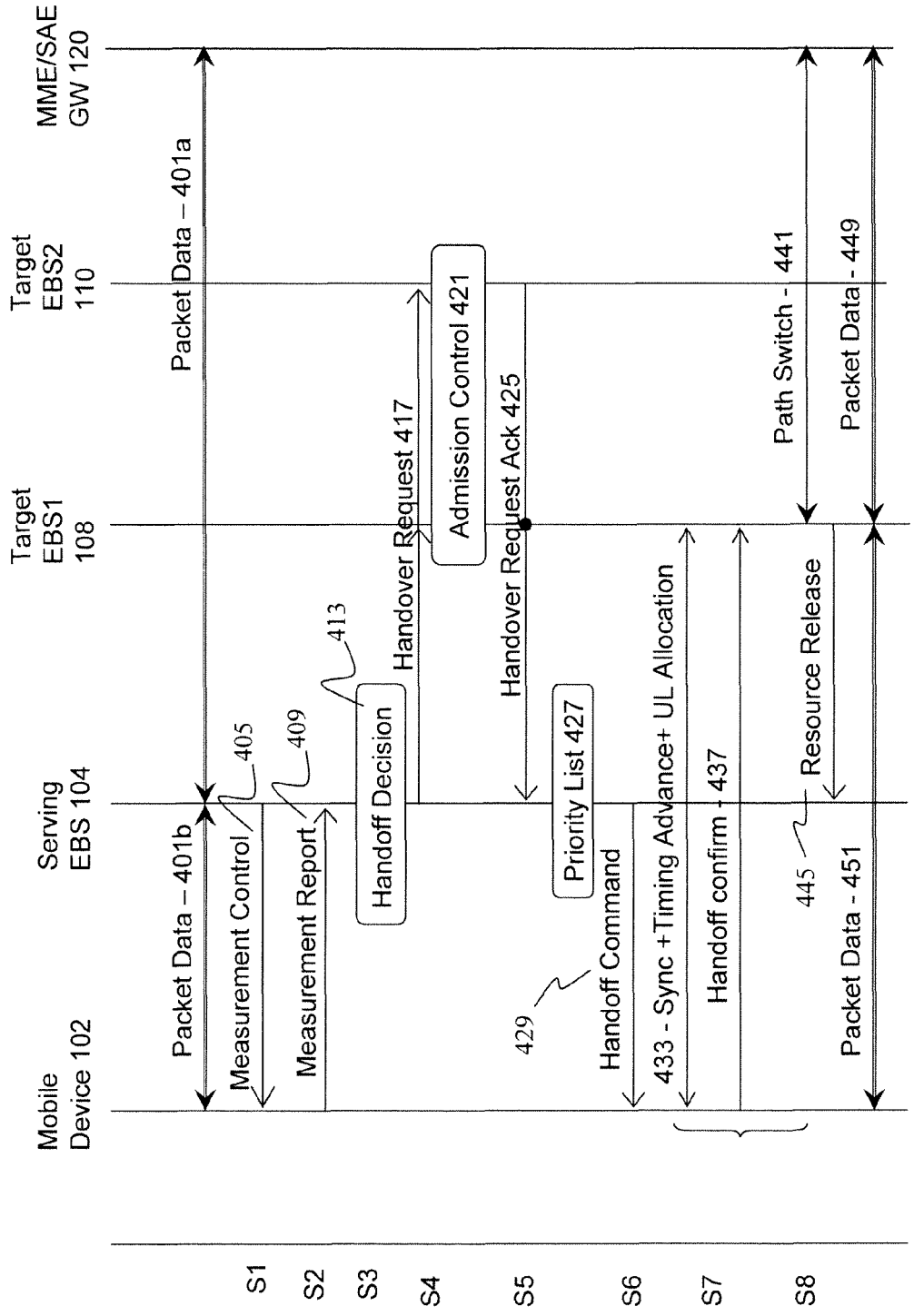
FIG. 4a is a signal flow diagram of the present disclosure used in an EBS.

To appreciate the operation of the network and an exemplary implementation of the present handoff process, it may be helpful next to consider an exemplary process for transferring a communications session from an EBS to another EBS. For that purpose, FIG. 4a is an exemplary handoff call flow for an exemplary implementation of the new process. Specifically, FIG. 4a illustrates a call flow diagram, when a Mobile Device 102 is connected to a Serving EBS 104 and the Mobile Device 102 is to be handed off to a Target EBS. Prior to the handoff, Mobile Device 102 is connected to the Serving EBS 104 and is capable of transferring Packet Data 401a and 401b to the rest of the network (MME/SAE GW 120) via the Serving EBS 104.

The Serving EBS 104 configures the handset measurement control procedures at 405 in order to obtain a measurement report 409 from the Mobile Device 102. Hence, in the example, the Mobile Device 102 receives the measurement control procedures and command at 405 from the Serving EBS 104 and subsequently sends a measurement report 409 of the surrounding EBS signal strengths, as measured by the Mobile Device 102, to the Serving EBS 104. The measurement report 409 can be sent either periodically or by a triggered event that is configured by the network 100. In one embodiment, the measurement report 409 is a RF signal strength measurement as measured by Mobile Device 102.

Upon receiving the measurement report 409, the Serving EBS 104 makes a handoff decision 413 to handoff the Mobile Device 102 to another EBS. However, in the procedure of FIG. 4a, the Serving EBS 104 does not know at this instant in time, which EBS the Mobile Device 102 will be transferred to. The ultimate handoff destination will be determined from among Target EBS1, EBS2, ..., or EBSn, based on a Ranking Matrix 463 (discussed below). While this illustrated example shows two target EBSs, for simplicity, it is understood that there could possibly be N Target EBSs.

Hence, in the example, the Serving EBS 104 sends a handoff request 417 to each potential Target EBS, that is to say to Target EBS1 108 and Target EBS2 110 in FIG. 4a. The handoff request 417 contains context information of the Mobile Device 102.

Target EBS1 108 and Target EBS2 110 perform admission control 421 in order to gauge the available network resources. Furthermore, each Target EBS1 108 and Target EBS2 110 sends a handoff request acknowledgement 425 to the Serving EBS 104.

Additionally, both Target EBS1 108 and Target EBS2 110 store the Mobile Device 102 context information and reserve Layer 1/Layer 2 (L1/L2) resources in order to assist with the handoff. In one exemplary embodiment, the L1/L2 resources are CRNTI or optional random access channel preamble, as well as the required radio resources to satisfy the QoS of Mobile Device 102's radio bearers. The L1/L2 resources will be released after a time-out to be utilized for other purposes.

The Serving EBS 104 receives handoff request acknowledgements 425 from both Target EBS1 108 and Target EBS2 110. Afterwards, the Serving EBS 104 generates a Priority List 427.

The Priority List 427 provides a ranking of the available neighboring EBSs and is based on information such as cell size, carrier frequency, site location, capacity or loading, available services, signal strengths, etc. Furthermore, the Priority List 427 also contains stored information of neighboring EBSs' loading condition, Handset Measurement Report 409 and data application and service quality available at the neighboring EBSs. The Priority List 427 is generated based on the ranking matrix. Table 1 below shows an example of a ranking matrix, and examples of the Priority List 427 are illustrated in Tables 2 and 3 (discussed below).

The Serving EBS 104 directs the Mobile Device 102, via a Handoff Command Message 429, to handoff to a Target EBS (in this embodiment EBS1 108). The Handoff Command Message 429 will contain either the whole Priority List 427 or the top-ranked Target EBSs from the Priority List 427.

The Mobile Device 102 receives the Handoff Command message 429 from the Serving EBS 104 with the Priority List 427 and begins contacting potential Target EBSs based on the Priority List 427. In the example of FIG. 4a, we will assume that Target EBS1 108 ranks highest on the Priority List 427. Hence, the Handset synchronizes with the Target EBS1 108 via Sync+Timing Advance UL Allocation message 433. Sync+Timing Advance UL Allocation message 433 also allows the Target EBS1 108 to assign an uplink allocation and a timing advance to the Mobile Device 102.

Afterwards, the Mobile Device 102 sends a handoff confirm message 437 to the Target EBS 108 to indicate the completion of the handoff procedure.

The Target EBS1 108 performs a Path Switch Procedure 441 to update the MME/SAE GW 120 of the handoff. After the Path Switch Procedure 441 is completed, the Target EBS1 108 sends a Resource Release Message 445 to the Serving EBS 104 to trigger the release of the system resources previously used by the Mobile Device 102 at the Serving EBS 104.

As a result of the handoff, Mobile Device 102 is connected to the Target EBS1 108 and packet data is transferred with MME/SAE GW 120 via Packet Data messages 449 and 451. However, if for some reason Mobile Device 102 cannot connect to Target EBS1 prior to handoff, then Mobile Device 102 may connect to any of the other available Target EBSs based upon the Priority List 427. Therefore, Mobile Device 102 does not need to wait to be assigned a new Target EBS resulting in handoff preparation latency.

Figure 4B:
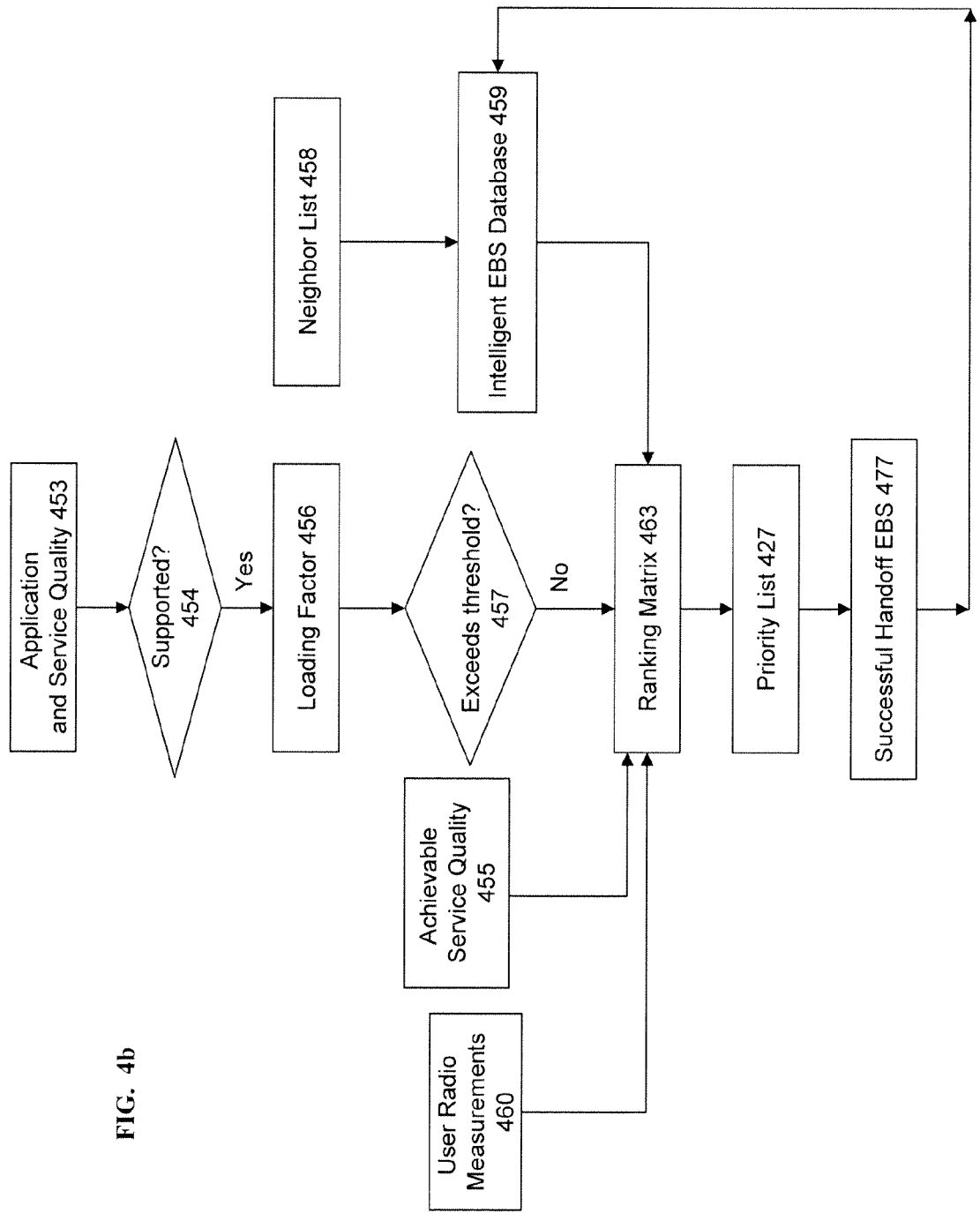
FIG. 4b is an exemplary block diagram of a ranking matrix that is utilized in one embodiment of the present disclosure.

To appreciate the operation of the network and implementation of the handoff process, it may be helpful next to consider an exemplary process for generating a Ranking Matrix 463, after which we will discuss deriving a Priority List 427 from such a matrix. For that purpose, FIG. 4b is a process flow for generating an exemplary Ranking Mechanism utilized in the handoff system. FIG. 4b illustrates several examples of parameters that are utilized by the Ranking Matrix 463 in the determination of the Priority List 427.

The Serving EBS 104 will generate the Ranking Matrix 463 based upon a number of variables. In this exemplary embodiment, the Ranking Matrix 463 is generated according to a Neighbor List 458, a Loading Factor 456, User Radio Measurements 460 and an Achievable Service Quality 455 of each of the potential Target EBSs. The Ranking Matrix 463 ranks each of the above-mentioned, individual parameters based upon an index for each potential Target EBS. Table 1 (shown below) illustrates an example of a Ranking Matrix. Furthermore, the Serving EBS 104 contains an Intelligent EBS Database 459 that contains all of the neighboring cell sites (Target EBSs) in a Neighbor List 458. The Intelligent EBS Database 459 is updated every time a handoff is made.

At 453, the Serving EBS 104 will determine what current Applications and Service Quality are utilized by the Mobile Device 102.

At 454, the Serving EBS 104 will determine if the current Applications and Service Quality of the Mobile Device 102 are supported by the current Target EBSs via use of the Intelligent EBS Database 459. It is noted that only wireless communication cells that are capable of supporting the current Applications and Achievable Service Quality 453 of the Mobile Device 102 will be included in the Ranking Matrix 463. This ensures efficiency in the handoff preparation process and reduces latency in the system. In one exemplary embodiment, the Applications and Service Quality 453 may be various IP packet applications and IP service quality requirements such as TCP/IP. If yes at 454, then processing branches to 456.

At 455, the Serving EBS 104 compiles an index of potential Target EBSs that support the current applications and achievable service quality of the Mobile Device 102. For example, if a particular Target EBS can provide more service quality, then the more influence this parameter will have in the Application/Service Quality rank index. Afterwards, processing for this branch proceeds to 463.

At 456, the Serving EBS 104 determines the Loading Factor 456 of the Target EBSs via use of the Intelligent EBS Database 459. The Loading Factor 456 is the current network loading condition of each Target EBS (that supports the current Handset Applications—discussed above).

At 457, the Serving EBS 104 examines the Loading Factor 456 to determine if the Loading Factor 456 exceeds a Threshold 457; the Target EBSs with a Loading Factor 456 exceeding the Threshold 457 will be excluded from the Ranking Matrix 463. This helps to ensure that the congested Target EBSs are not overwhelmed unnecessarily with congestion by distributing the network load across other viable Target EBSs. Therefore, the Target EBSs with an acceptable Loading Factor 456 will be included in the Ranking Matrix 463.

At 458, the Serving EBS 104 determines the Neighbor List 458, which is a listing of all available neighboring cell sites, i.e. Target EBSs. The Neighbor List 458 is contained within the Intelligent EBS Database 459. The Neighbor List 458 can be adjusted based upon the proximity of the Target EBSs to the Serving EBS 104. Furthermore, the Neighbor List 458 is updated based upon how frequently the Mobile Device 102 is handed over from the Serving EBS 104. For example, if a Mobile Device 102 is handed over to a potential Target EBS from the Serving EBS 104, then the Neighbor List rank index of that particular EBS will be updated in the Serving EBS' 104 Intelligent Database 459.

At 459, the Serving EBS 104 will view the Neighbor List 458 via use of the Intelligent EBS Database 459.

At 460, the Serving EBS 104 will determine the User Radio Measurements 460 of Mobile Device 102. The User Radio Measurements 460 are the strength of the received RF-signal, measured by the Mobile Device 102 and from Target EBSs in the vicinity. This ensures that multi-path and various other propagation issues are accounted for. For example, if the RF signal of a potential Target EBS is stronger than other potential Target EBSs, then the more influence this parameter will have in the RF-Strength rank index. Also, some neighboring EBSs may not be detected at an adequate level by the Mobile Device 102, e.g. due to an obstruction.

At 463, the Serving EBS 104 generates the Ranking Matrix 463. The Ranking Matrix 463 weights the Neighbor List 467, the Loading Factor 459, User Radio Measurements 471 and the Achievable Service Quality 473, for each of the potential Target EBSs based upon an index. Table 1 illustrates an example of such a Ranking Matrix. In the example of Ranking Matrix 463, a Final Target EBS ranking is calculated by multiplying the above four rank indices of all potential Target EBSs with a set of pre-defined weighting factors. The values of the weighting factors are based on the network deployment scenario established by a service operator on a per sector basis. For example, the weighting factors for a Macro-cellular network and Urban Canyon network will be different. The Macro-cellular network scenario may emphasize the User Radio Measurements 460, whereas the Urban Canyon network scenario may emphasize the Neighbor List 458 as illustrated in Table 1. Afterwards, the Final Target EBS ranking entries will be ranked according to whether the Urban-Canyon or Macro-Cell scenario is employed.

TABLE 1

| Ranking Matrix | | | | | | |
|---|---|---|---|---|---|---|
| Target | Neighbor | RF Strength | Application - Service Quality | Loading | Urban- Canyon | Macro- Cell |
| EBS1 | 1 | 2 | 4 | 3 | 1.7 | 2.1 |
| EBS2 | 2 | 1 | 1 | 4 | 1.9 | 1.5 |
| EBS3 | 3 | 4 | 2 | 1 | 2.9 | 3.3 |
| EBS4 | 4 | 3 | 3 | 2 | 3.5 | 3.1 |

In the example provided by Table 1, the Urban Canyon scenario uses the following weighting factors: 5/10 weighing to the Neighbor List 458, 2/10 weighting to the User Radio Measurements 460, 1/10 weighting to the Achievable Service Quality 455 and 1/10 weighting to the Loading Factor 456. In this exemplary embodiment, the Target EBS with the lowest Neighbor rank index is Target EBS1 (the lowest score is the best potential handoff candidate). In other words, Target EBS1 is ranked first out of the four possible EBSs for the Neighbor rank index. This reflects the fact that, in this example, the Urban Canyon network scenario emphasizes the Neighbor List 458 index by multiplying the index by a 6/10 weighting factor. Therefore, even though the Achievable Service Quality 455 index of EBS1 is ranked fourth out of the four possible EBSs, this particular index is de-emphasized in this Urban Canyon network scenario by being multiplied by a 1/10 weighting factor.

At 427, the serving EBS 104 generates the Priority List 427 from the Ranking Matrix 463 illustrated in Table 1. The Priority List 427 may be a whole or partial copy of the information contained in the Ranking Matrix 463. In this example, for ease of illustration, the Priority List 427 contains the same entries as the Ranking Matrix 463. However, it is understood that in an actual implementation, the Priority List 427 may be parsed down as shown in Tables 4, 5 and 6. Table 2 illustrates an example of the Priority List 427 for the Urban-Canyon scenario. It is noted that Ranking Matrix 463 has been re-ranked according to the Urban-Canyon matrix entries (not shown). As illustrated in Table 2, Target EBS1 has the lowest accumulated score in the Urban-Canyon field. Therefore, Mobile Device 102 would first attempt to handoff to Target EBS1. If for some reason Mobile Device 102 could not handoff to Target EBS1, then Mobile Device 102 would attempt the next entry in the Priority List 427. In this example, Mobile Device 102 would attempt to handoff to Target EBS2 since that is the next available Target EBS in the Urban-Canyon list. If Mobile Device 102 could not handoff to Target EBS2, then Mobile Device 102 would attempt to handoff to Target EBS3 and Target EBS4, in order.

TABLE 2

Priority List Ranked According to Urban-Canyon Scenario

| Target | Geo-Neighbor | RF Strength | Application - Service Quality | Loading | Urban-Canyon Ranking | Macro-Cell Ranking |
|---|---|---|---|---|---|---|
| EBS1 | 1 | 2 | 4 | 3 | 1.7 | 2.1 |
| EBS2 | 2 | 1 | 1 | 4 | 1.9 | 1.5 |
| EBS3 | 3 | 4 | 2 | 1 | 2.9 | 3.3 |
| EBS4 | 4 | 3 | 3 | 2 | 3.5 | 3.1 |

In the Macro-Cellular example provided by Table 1, the scenario uses the following weighting factors: 2/10 weighing to the Neighbor List 458, 6/10 weighting to the User Radio Measurements 460, 1/10 weighting to the Achievable Service Quality 455 and 1/10 weighting to the Loading Factor 456. In this exemplary embodiment, the Target EBS with the lowest User Radio Measurements 460 (i.e. RF Strength) rank index is Target EBS2 (the lowest score is the best potential handoff candidate). In other words, Target EBS2 is ranked first out of the four possible EBSs for the User Radio Measurements 460 (i.e. RF Strength) rank index. This reflects the fact that, in this example, the Macro-Cellular network scenario emphasizes the User Radio Measurements 460 (i.e. RF Strength List) index by multiplying the index by a 6/10 weighting factor. Therefore, even though the Loading Factor 456 index of EBS2 is ranked fourth out of the four possible EBSs, this particular index is de-emphasized in this Macro-Cellular network scenario by being multiplied by a 1/10 weighting factor.

Table 3 illustrates an example of the Priority List 427 for the Macro-Cellular scenario. It is noted that Ranking Matrix 463 has been re-ranked according to the Macro-Cellular matrix entries (not shown). As illustrated in Table 3, Target EBS2 has the lowest accumulated score in the Macro-Cellular field. Therefore, Mobile Device 102 would first attempt to handoff to Target EBS2. If for some reason Mobile Device 102 could not handoff to Target EBS2, then Mobile Device 102 would attempt the next entry in the Priority List 427. In this example, Mobile Device 102 would attempt to handoff to Target EBS1 since that is the next available Target EBS in the Macro-Cellular list. If Mobile Device 102 could not handoff to Target EBS1, then Mobile Device 102 would attempt to handoff to Target EBS4 and Target EBS3, in order.

TABLE 3

Priority List Ranked According to Macro-Cellular Scenario

| Target | Geo-Neighbor | RF Strength | Application - Service Quality | Loading | Urban-Canyon Ranking | Macro-Cell Ranking |
|---|---|---|---|---|---|---|
| EBS2 | 2 | 1 | 1 | 4 | 1.9 | 1.5 |
| EBS1 | 1 | 2 | 4 | 3 | 1.7 | 2.1 |
| EBS4 | 4 | 3 | 3 | 2 | 3.5 | 3.1 |
| EBS3 | 3 | 4 | 2 | 1 | 2.9 | 3.3 |

At 477, the new Serving EBS will update the Intelligent Database 459 that a Successful Handoff 477 is completed. The new Serving EBS' rank index will be increased in the Intelligent EBS Database 459, regardless of whether the Urban-Canyon matrix of Table 2 or the Macro-Cellular matrix of Table 3 is utilized.

Table 4 illustrates an example of a parsed down Priority List 427 for the Macro-Cellular scenario. It is noted that the Priority List 427 illustrated in Table 4 contains only "Target" and "Macro-Cell" entries from the Ranking Matrix 463. This allows the amount of handoff traffic sent to the Mobile Device 102 to be reduced. As illustrated in Table 4, Target EBS2 has the lowest accumulated score in the Macro-Cellular field. Therefore, Mobile Device 102 would first attempt to handoff to Target EBS2. If for some reason Mobile Device 102 could not handoff to Target EBS2, then Mobile Device 102 would attempt the next entry in the Priority List 427. In this example, Mobile Device 102 would attempt to handoff to Target EBS1 since that is the next available Target EBS in the Macro-Cellular list. If Mobile Device 102 could not handoff to Target EBS1, then Mobile Device 102 would attempt to handoff to Target EBS4 and Target EBS3, in order.

TABLE 4

Parsed Down Priority List Ranked According to Macro-Cellular Scenario

| Target | Macro-Cell Ranking |
|---|---|
| EBS2 | 1.5 |
| EBS1 | 2.1 |
| EBS4 | 3.1 |
| EBS3 | 3.3 |

Table 5 illustrates an example of a further parsed down Priority List 427 for the Macro-Cellular scenario. Table 5 illustrates an example of a further parsed down Priority List 427 for the Macro-Cellular scenario. It is noted that the Priority List 427 illustrated in Table 5 contains only two "Target" and "Macro-Cell" entries from the Ranking Matrix 463. This allows the amount of handoff traffic sent to the Mobile Device 102 to be reduced. As illustrated in Table 5, Target EBS2 has the lowest accumulated score in the Macro-Cellular field. Therefore, Mobile Device 102 would first attempt to handoff to Target EBS2. If for some reason Mobile Device 102 could not handoff to Target EBS2, then Mobile Device 102 would attempt the next entry in the Priority List 427. In this example, Mobile Device 102 would attempt to handoff to Target EBS1 since that is the next available Target EBS in the Macro-Cellular list. If Mobile Device 102 could not handoff to Target EBS1, then Mobile Device 102 would coordinate with the Serving EBS 104 in order to be handed off to a different EBS.

TABLE 5

Parsed Down Priority List Ranked According to Macro-Cellular Scenario

| Target | Macro-Cell Ranking |
|---|---|
| EBS2 | 1.5 |
| EBS1 | 2.1 |

Figure 5:
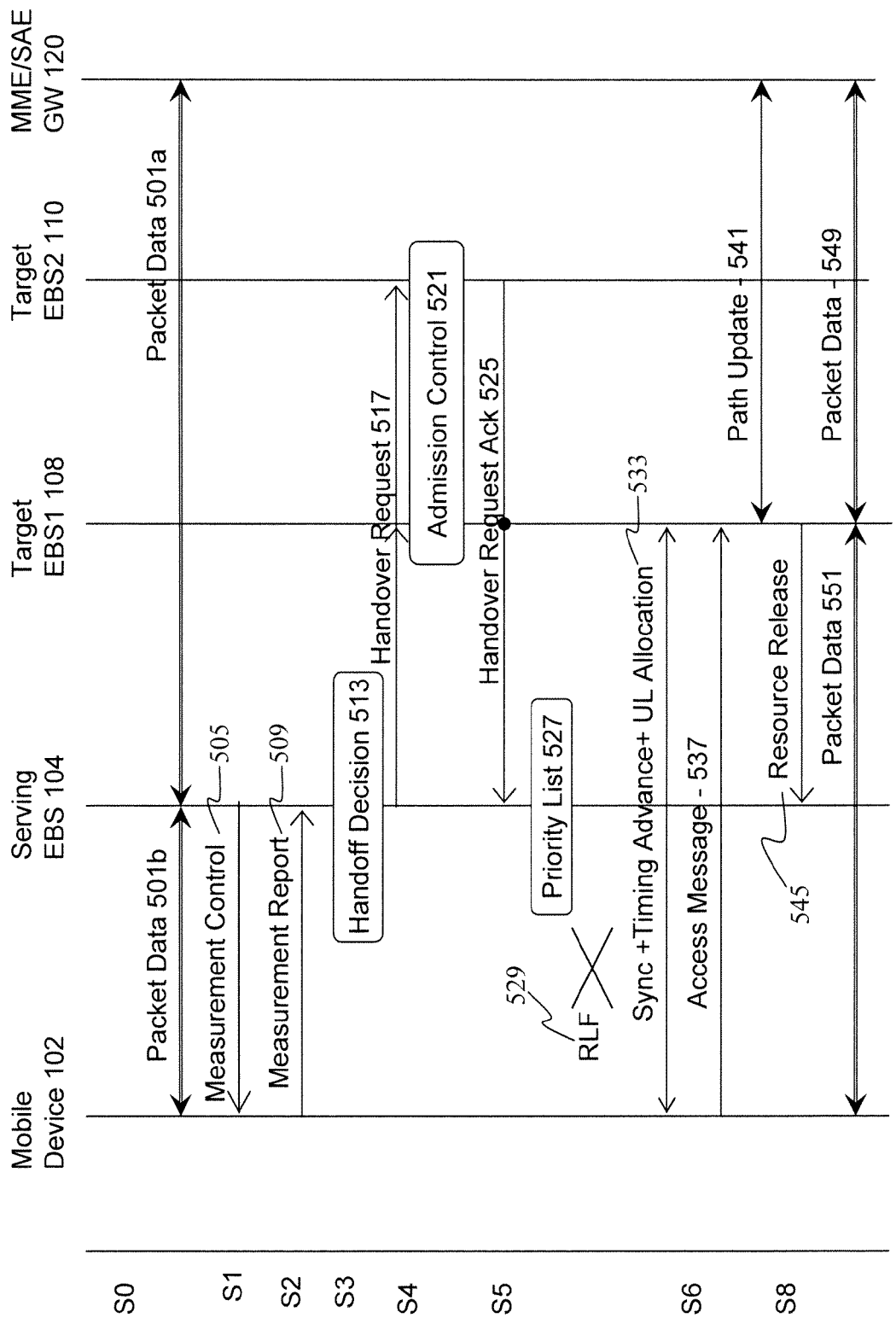
FIG. 5 is a signal flow diagram of the present disclosure when a radio link failure occurs after handoff preparation, but prior to the mobile device receiving a priority list.

FIG. 5 illustrates another call flow example involving handoff preparation during a radio link failure (RLF), but prior to the Mobile Device 102 obtaining the Priority List 527. Specifically, FIG. 5 illustrates a call flow diagram, when a Mobile Device 102 is connected to a Serving EBS 104 and the Mobile Device 102 is to be handed off to a Target EBS. Prior to the handoff, Mobile Device 102 is connected to the Serving EBS 104 and is capable of transferring Packet Data 501a and 501b to the rest of the network (MME/SAE GW 120) via the Serving EBS 104.

The Serving EBS 104 configures the handset measurement control procedures at 505 in order to obtain a measurement report 509 from the Mobile Device 102. Hence, in the example, the Mobile Device 102 receives the measurement control procedures and command at 505 from the Serving EBS 104 and subsequently sends a measurement report 509 of the surrounding EBS signal strengths, as measured by the Mobile Device 102, to the Serving EBS 104. The measurement report 509 can be sent either periodically or by a triggered event that is configured by the network 100. In one embodiment, the measurement report 509 is a RF signal strength measurement as measured by Mobile Device 102.

Upon receiving the measurement report 509, the Serving EBS 104 makes a handoff decision 513 to handoff the Mobile Device 102 to another EBS. However, in the procedure of FIG. 5, the Serving EBS 104 does not know at this instant in time, which EBS the Mobile Device 102 will be transferred to. The ultimate handoff destination will be determined from among Target EBS1, EBS2, . . . , or EBSn, based on a Ranking Matrix 463. While this illustrated example shows two target EBSs, for simplicity, it is understood that there could possibly be N Target EBSs.

Hence, in the example, the Serving EBS 104 sends a handoff request 517 to each potential Target EBS, that is to say to Target EBS1 108 and Target EBS2 110 in FIG. 5. The handoff request 517 contains context information of the Mobile Device 102.

Target EBS1 108 and Target EBS2 110 perform admission control 521 in order to gauge the available network resources. Furthermore, each Target EBS1 108 and Target EBS2 110 sends a handoff request acknowledgement 525 to the Serving EBS 104.

Additionally, both Target EBS1 108 and Target EBS2 110 store the Mobile Device 102 context information and reserve Layer 1/Layer 2 (L1/L2) resources in order to assist with the handoff. In one exemplary embodiment, the L1/L2 resources are CRNTI or access parameters.

The Serving EBS 104 receives handoff request acknowledgements 525 from both Target EBS1 108 and Target EBS2 110. Afterwards, the Serving EBS 104 generates a Priority List 527.

The Priority List 527 is a ranking of the available neighboring EBSs and is based on information such as cell size, carrier frequency, site location, capacity or loading, available services, signal strengths, etc. Furthermore, the Priority List 527 also contains stored information of neighboring EBSs' loading condition, handset measurement report 509 and data application and service quality available at the neighboring EBSs. The Priority List 527 is generated based on the ranking matrix. Table 1 above shows an example of a ranking matrix, and examples of the Priority List 527 are illustrated in Tables 2 and 3 (discussed above).

If the radio link fails resulting in a Radio Link Failure (RLF) 529, then the Mobile Device 102 will not receive a Handoff Command Message, which typically instructs the Mobile Device 102 to connect to another Target EBS. However, the Mobile Device 102 will autonomously handoff to the best Target EBS based on current measurement control procedures 505 after the RLF 529. If the best Target EBS has received context information from the Serving EBS 104, then the Mobile Device 102 will not go through an idle-to-active transition. As a result, the Target EBS will be ready for the handoff of Mobile Device 102.

The Mobile Device 102 synchronizes with the Target EBS1 108 via Sync+Timing Advance UL Allocation message 533. Sync+Timing Advance UL Allocation message 533 also allows the Target EBS1 108 to assign an uplink allocation and a timing advance to the Mobile Device 102.

Afterwards, the Mobile Device 102 sends an Access Message 537 to the Target EBS1 108.

The Target EBS1 108 performs a Path Update 541 to update the MME/SAE GW 120 of the handoff. After the Path Update 541 is completed, the Target EBS1 108 sends a Resource Release Message 545 to the Serving EBS 104 to trigger the release of the system resources previously used by the Mobile Device 102 at the Serving EBS 104.

As a result of the handoff, Mobile Device 102 is connected to the Target EBS1 108 and packet data is transferred with MME/SAE GW 120 via Packet Data messages 549 and 551.

Figure 6:
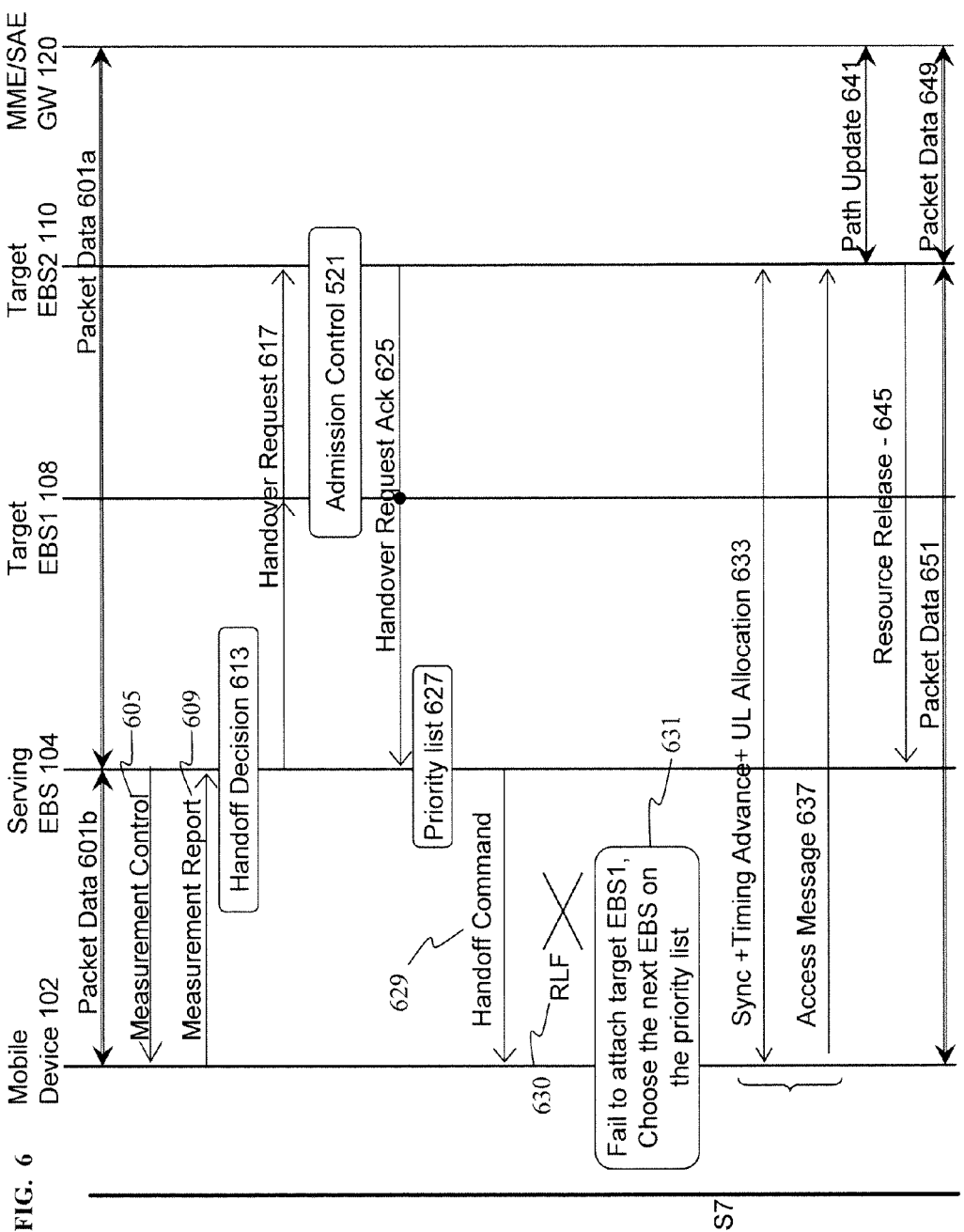
FIG. 6 is a signal flow diagram of the present disclosure when a radio link failure occurs after the mobile device receives the priority list.

FIG. 6 illustrates another call flow example involving handoff preparation during a RLF, after the Mobile Device 102 receives the Priority List 627. Specifically, FIG. 6 illustrates a call flow diagram, when a Mobile Device 102 is connected to a Serving EBS 104 and the Mobile Device 102 is to be handed off to a Target EBS. Prior to the handoff, Mobile Device 102 is connected to the Serving EBS 104 and is capable of transferring Packet Data 601a and 601b to the rest of the network (MME/SAE GW 120) via the Serving EBS 104.

The Serving EBS 104 configures the handset measurement control procedures at 605 in order to obtain a measurement report 609 from the Mobile Device 102. Hence, in the example, the Mobile Device 102 receives the measurement control procedures and command at 605 from the Serving EBS 104 and subsequently sends a measurement report 609 of the surrounding EBS signal strengths, as measured by the Mobile Device 102, to the Serving EBS 104. The measurement report 609 can be sent either periodically or by a triggered event that is configured by the network 100. In one embodiment, the measurement report 609 is a RF signal strength measurement as measured by Mobile Device 102.

Upon receiving the measurement report 609, the Serving EBS 104 makes a handoff decision 613 to handoff the Mobile Device 102 to another EBS. However, in the procedure of FIG. 6, the Serving EBS 104 does not know at this instant in time, which EBS the Mobile Device 102 will be transferred to. The ultimate handoff destination will be determined from among Target EBS1, EBS2, . . . , or EBSn, based on a Ranking Matrix 463. While this illustrated example shows two target EBSs, for simplicity, it is understood that there could possibly be N Target EBSs.

Hence, in the example, the Serving EBS 104 sends a handoff request 617 to each potential Target EBS, that is to say Target EBS1 108 and Target EBS2 110 in FIG. 6. The handoff request 617 contains context information of the Mobile Device 102.

Target EBS1 108 and Target EBS2 110 perform admission control 621 in order to gauge the available network resources. Furthermore, each Target EBS1 108 and Target EBS2 110 sends a handoff request acknowledgement 625 to the Serving EBS 104.

Additionally, both Target EBS1 108 and Target EBS2 110 store the Mobile Device 102 context information and reserve Layer 1/Layer 2 (L1/L2) resources in order to assist with the handoff. In one exemplary embodiment, the L1/L2 resources are CRNTI or access parameters.

The Serving EBS 104 receives handoff request acknowledgements 625 from both Target EBS1 108 and Target EBS2 110. Afterwards, the Serving EBS 104 generates a Priority List 627.

The Priority List 627 is a ranking of the available neighboring EBSs and is based on information such as cell size, carrier frequency, site location, capacity or loading, available services, signal strengths, etc. Furthermore, the Priority List 627 also contains stored information of neighboring EBSs' loading condition, handset measurement report 609 and data application and service quality available at the neighboring EBSs. The Priority List 627 is generated based on the ranking matrix. Table 1 above shows an example of a ranking matrix, and examples of the Priority List 627 are illustrated in Tables 2 and 3 (discussed above).

The Serving EBS 104 attempts to direct the Mobile Device 102, via a Handoff Command Message 629, to handoff to a Target EBS (in this example EBS 108). The Handoff Command Message 629 will contain either the whole Priority List 627 or the top-ranked Target EBS from the Priority List 627.

The Mobile Device 102 receives the Handoff Command message 629 from the Serving EBS 104 with the Priority List 627 and begins contacting potential target EBSs based on the Priority list 627. In the example of FIG. 6, we will assume that the EBS1 108 ranks highest on the Priority List.

However, in this example RLF 630 occurs resulting in a radio link failure between the Mobile Device 102 and Target EBS1 108. The Mobile Device 102 will attempt to connect to the Target EBS1 108, but will Fail to Attach 631. Therefore, the Mobile Device 102 cannot be synchronized with EBS1 108 and cannot attach to the Target EBS1 108. However, the Mobile Device 102 will autonomously attempt to attach to the next available Target EBS in the Priority List 627. If another radio link failure occurs, then the Mobile Device 102 will attempt to connect to the subsequent EBS contained in the Priority List 627, according to the priority list ranking.

The Mobile Device 102 synchronizes with the Target EBS2 110 via Sync+Timing Advance UL Allocation message 633. Sync+Timing Advance UL Allocation message 633 also allows the Target EBS2 110 to assign an uplink allocation and a timing advance to the Mobile Device 102.

Afterwards, the Mobile Device 102 sends an Access Message 637 to the Target EBS2 110.

The Target EBS2 110 performs a Path Update 641 to update the MME/SAE GW 120 of the handoff. After the Path Update 641 is completed, the Target EBS2 110 sends a Resource Release Message 645 to the Serving EBS 104 to trigger the release of the system resources previously used by the Mobile Device 102 at the Serving EBS 104.

As a result of the handoff, Mobile Device 102 is connected to the Target EBS2 110 and packet data is transferred with MME/SAE GW 120 via Packet Data messages 649 and 651.

Figure 7:
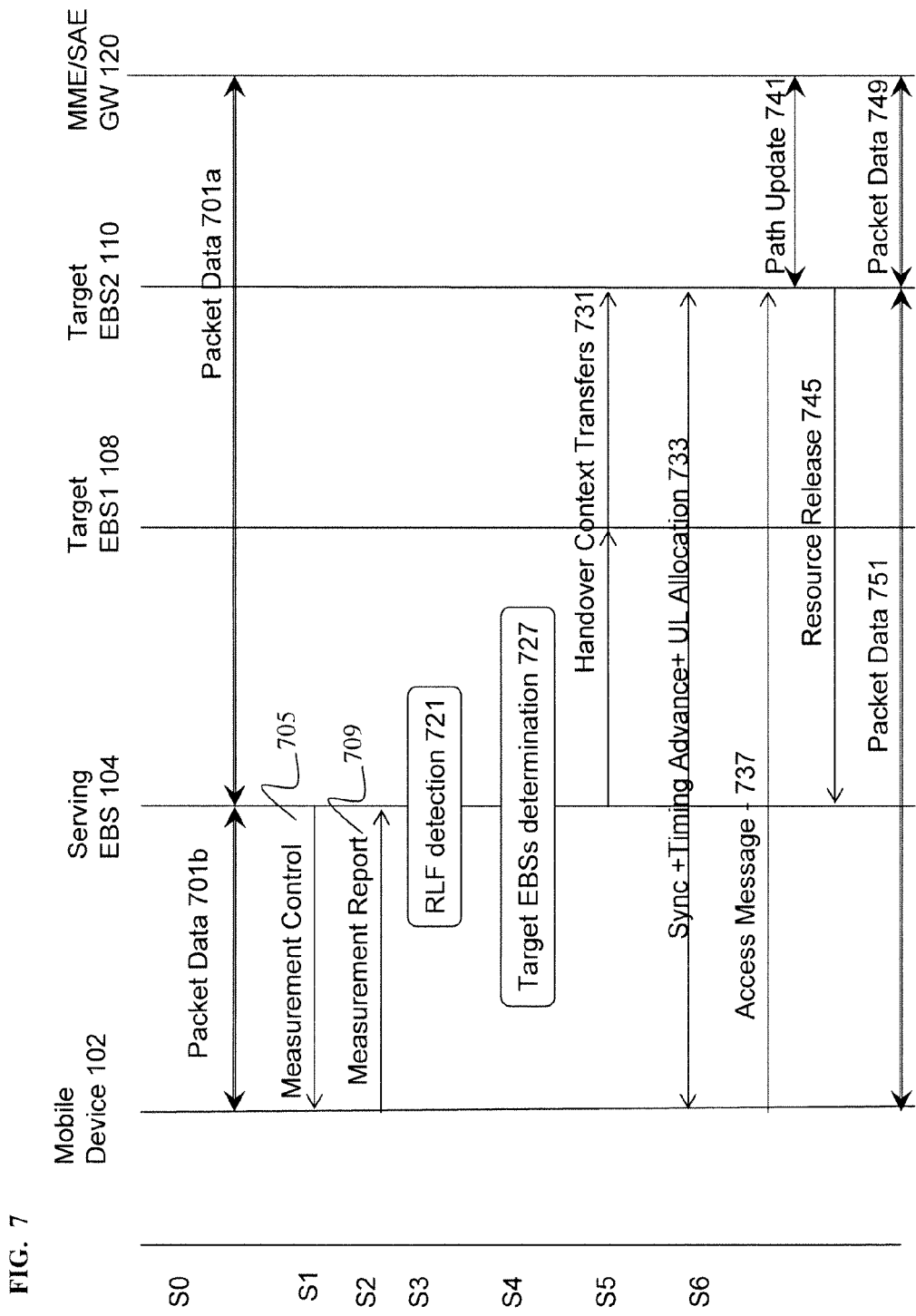
FIG. 7 is a signal flow diagram of the present disclosure when a radio link failure occurs before handoff preparation.

FIG. 7 illustrates another call flow example involving handoff preparation during a RLF, but prior to preparation of the Priority List 727. Specifically, FIG. 7 illustrates a call flow diagram, when a Mobile Device 102 is connected to a Serving EBS 104 and the Mobile Device 102 is to be handed off to a Target EBS. Prior to the handoff, Mobile Device 102 is connected to the Serving EBS 104 and is capable of transferring Packet Data 701a and 701b to the rest of the network (MME/SAE GW 120) via the Serving EBS 104.

The Serving EBS 104 configures the handset measurement control procedures at 705 in order to obtain a measurement report 709 from the Mobile Device 102. Hence, in the example, the Mobile Device 102 receives the measurement control procedures and command at 705 from the Serving EBS 104 and subsequently sends a measurement report 709 of the surrounding EBS signal strengths, as measured by the Mobile Device 102, to the Serving EBS 104. The measurement report 709 can be sent either periodically or by a triggered event that is configured by the network 100. In one embodiment, the measurement report 709 is a RF signal strength measurement as measured by Mobile Device 102.

Upon receiving the measurement report 709, the Serving EBS 104 typically makes a handoff decision (not shown) to handoff the Mobile Device 102 to another EBS. However, in this exemplary embodiment a RLF (not shown) occurs, resulting in a radio link failure between the Mobile Device 102 and the Serving EBS 104.

The Serving EBS 104 automatically detects the RLF.

The Serving EBS 104 determines potential Target EBSs based on a ranking matrix generated from previous measurement reports and intelligent database 459, similar to Handoff Decision 413 in FIG. 4a.

Hence, in the example, the ultimate handoff destination, Target EBS 727, will be determined from among Target EBS1, EBS2, . . . , or EBSn, based on the Ranking Matrix 463, generated from the previous measurement reports and Intelligent Database 459. The Ranking Matrix 463 is similar to that utilized in FIG. 4a-b. While this example shows two target EBSs, for simplicity, it is understood that there could possibly be N Target EBSs. Although the Serving EBS 104 has already determined Target EBS 727, the possibility exists for another RLF. Therefore, the Serving EBS 104 transfers Context Information 731 to multiple Target EBSs; specifically Target EBS1, EBS2, . . . , or EBSn. This ensures that the various Target EBSs have the capacity to support communication with Mobile Device 102 in the case of another RLF.

The Mobile Device 102 synchronizes with the Target EBS2 110 via Sync+Timing Advance UL Allocation message 733. Sync+Timing Advance UL Allocation message 733 also allows the Target EBS2 110 to assign an uplink allocation and a timing advance to the Mobile Device 102.

Afterwards, the Mobile Device 102 sends an Access Message 737 to the Target EBS2 110.

The Target EBS2 110 performs a Path Update 741 to update the MME/SAE GW 120 of the handoff. After the Path Update 741 is completed, the Target EBS2 110 sends a Resource Release Message 745 to the Serving EBS 104 to trigger the release of the system resources previously used by the Mobile Device 102 at the Serving EBS 104.

As a result of the handoff, Mobile Device 102 is connected to the Target EBS2 110 and packet data is transferred with MME/SAE GW 120 via Packet Data messages 749 and 751. Furthermore, if Target EBS2 110 received context information from the Serving EBS 104 (as described above), then the Mobile Device 102 will avoid going through idle-to-active transitioning resulting in a reduction in handoff preparation latency. Therefore, the handoff robustness of the system will be improved.

As shown by the above discussion, many of the functions relating to the distinguishing the human user from an automation handoff processing in the EBS, such as developing the ranking matrix and the priority list, are implemented on processors in the EBS.

As known in the data processing and communications arts, such a processor typically comprises a central processing unit (CPU) or similar device, an internal communications bus, various types of memory or storage media (RAM, ROM, EEPROM, cache memory, disk drives, etc.) for code and data storage, and one or more network or other interface cards or ports for inter-device communication purposes. The software functionalities involve programming, including executable code as well as associated stored data, e.g. objects for the data processing and related signaling performed by the EBS. The software code is executable by the CPU. In operation, the code is stored within the storage media in or associated with the CPU. At other times, however, the software may be stored at other locations and/or transported for loading into the appropriate EBS. Execution of such code by a processor of the EBS enables the EBS platform to implement the methodology for handoff in essentially the manner performed in the embodiments discussed and illustrated herein. As used herein, terms such as computer or machine "readable medium" therefore refer to any storage medium capable of participating in providing instructions to a processor for execution.

The concepts discussed above are amenable to a variety of changes and/or adaptations. For example, in the specific examples above, the ranking matrix and the priority list were generated in the Serving EBS. Those skilled in the art will recognize, however, that such processing may be implemented in other network nodes such as a base station controller (if provided separately), the gateway, etc.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

| | |
|---|---|
| CDMA | Code Division Multiple Access |
| EBS | Enhanced Base Station |
| LTE | Long Term Evolution |
| AP | Access Point |
| WiMAX | Worldwide Interoperability for Microwave Access |
| UMB | Ultra Mobile Broadband |
| EVDO | Evolution Data Only |
| GW | Gateway |
| Tx | Transmitter |
| Rx | Receiver |
| MAC | Media Access Control |
| RLC | Radio Link Control |
| ROHC | Robust Header Compression |
| IP | Internet Protocol |
| UDP | User Datagram Protocol |
| RTP | Real-time Transport Protocol |
| TCP | Transmission Control Protocol |
| RF | Radio Frequency |
| CRNTI | Cell Radio Network Temporary Identifier |
| NGN | Next Generation Network |
| AMPS | Advanced Mobile Phone System |
| TDMA | Time Division Multiple Access |
| GSM | Global System for Mobile communications |
| UE | User Equipment |
| UL | Uplink |
| L1/L2 | Layer 1/Layer 2 |
| EBS | Evolved Base Station |
| aGW | access GateWay |
| eRNC | evolved Radio Network Controller |
| MME | Mobility Management Entity |
| SAE | System Architecture Evolution |

What is claimed is:

1. A method for connecting a mobile device to a destination base station in a wireless communications network, comprising steps of a serving base station to which the mobile device is connected:
    identifying a plurality of possible target base stations for a handoff of the mobile device;
    sending a handoff request including context information of the mobile device from the serving base station to each of the identified plurality of possible target base stations, the context information including an identification of the mobile device;
    receiving from each of the plurality of possible target base stations an acknowledgment in response to the handoff request, the acknowledgement indicating that at least a portion of the context information has been stored at a respective one of the plurality of possible target base stations and that resources have been reserved at the respective one of the plurality of possible target base stations for the mobile device;
    responsive to the received acknowledgements, prioritizing the plurality of possible target base stations for the handoff based on predetermined parameters with respect to the plurality of possible target base stations;
    initiating the handoff of the mobile device based on the prioritized plurality of possible target base stations; and
    upon receiving, from one of the prioritized plurality of possible target base stations, an indication of a successfully established connection for the initiated handoff of the mobile device, releasing resources of the serving base station reserved for the mobile device.

2. The method of claim 1, wherein the context information includes a Cell Radio Network Temporary Identifier (CRNTI).

3. The method of claim 1, wherein the identifying step comprises:
    obtaining a measurement report generated by the mobile device, the measurement report including respective signal strengths measured by the mobile device for base stations identified as surrounding base stations with respect to the mobile device; and selecting the plurality of possible target base stations from among the surrounding base stations identified within the obtained measurement report, based in part on the respective signal strengths of the plurality of possible target base stations from the measurement report.

4. The method of claim 3, wherein the measurement report is obtained by the serving base station periodically from the mobile device.

5. The method of claim 3, wherein the measurement report is obtained by the serving base station in response to a triggered event that is configured in the wireless communications network.

6. The method of claim 3, wherein the selecting step further comprises:

for each of the surrounding base stations identified in the measurement report, determining whether the base station is an available neighboring base station of the serving base station; and identifying the plurality of possible target base stations by selecting only those surrounding base stations determined to be available neighboring base stations.

7. The method of claim 6, wherein a list of the available neighboring base stations is stored in a neighbor list at a database that is accessible to the serving base station.

8. The method of claim 7, further comprising:

adjusting the neighbor list based on a proximity of each of the neighboring base stations with respect to the serving base station.

9. The method of claim 7, wherein the prioritizing step comprises:

generating a ranking matrix of parameters with respect to the plurality of possible target base stations, the parameters including the neighbor list and the respective signal strengths of the plurality of possible target base stations from the measurement report;

calculating a ranking value for each of the plurality of possible target base stations based on the parameters in the generated ranking matrix; and generating a priority list of the plurality of possible target base stations ordered in accordance with the respective ranking value calculated for each of the plurality of possible target base stations, wherein the handoff of the mobile device is initiated based on the generated priority list.

10. The method of claim 9, further comprising:

responsive to a received indication of a successfully established connection for the initiated handoff of the mobile device, updating the calculated ranking value in the ranking matrix for the neighbor list parameter of the one possible target base station from which the indication was received.

11. The method of claim 9, wherein the parameters of the ranking matrix for each of the plurality of possible target base stations further include a cell size, a carrier frequency, a capacity or loading factor, a cell site location and availability of services.

12. The method of claim 9, wherein the initiating step comprises:

sending the priority list to the mobile device along with instructions directing the mobile device to attempt to connect to at least one of the plurality of possible target base stations according to the priority list, wherein an autonomous attempt to connect to a next possible target base station based on the ordered plurality of possible target base stations in the priority list occurs in response to a radio link failure during an attempt to connect to a possible target base station.

13. The method of claim 9, wherein the parameters further include at least one of: a loading factor or achievable service quality for the plurality of possible target base stations.

14. The method of claim 13, wherein the ranking matrix includes only target base stations that are capable of supporting the achievable service quality.

15. A base station server comprising:

a network communication device configured to exchange data communications through a first type of network, the first type of network including at least one database accessible to the network communication device;

a processor coupled to the network communication device;

a storage device accessible to the processor; and an application program in the storage device, the application program including a plurality of functions, wherein execution of the application program by the processor configures the base station server to exchange data communications related to the plurality of functions with a mobile device through the first type of network, wherein the processor is configured to perform functions, including functions to:

identify a plurality of possible target base stations for a handoff of the mobile device;

send a handoff request including context information of the mobile device to each of the identified plurality of possible target base stations, the context information including an identification of the mobile device;

receive from each of the plurality of possible target base stations an acknowledgment in response to the handoff request, the acknowledgement indicating that at least a portion of the context information has been stored at a respective one of the plurality of possible target base stations and that resources have been reserved at the respective one of the plurality of possible target base stations for the mobile device;

responsive to the received acknowledgements, prioritize the plurality of possible target base stations for the handoff based on predetermined parameters with respect to the plurality of possible target base stations;

initiate the handoff of the mobile device based on the prioritized plurality of possible target base stations; and release resources reserved for the mobile device, in response to an indication, received from one of the prioritized plurality of possible target base stations, of a successfully established connection for the initiated handoff of the mobile device.

16. An article of manufacture, comprising a non-transitory computer-readable storage medium and a computer program for enabling a base station server to access a first type of network, the computer program being embodied on the computer-readable storage medium and including instructions that, when executed, cause the base station server to implement functions, including functions to:

identify a plurality of possible target base stations for a handoff of a mobile device connected to the base station server;

send a handoff request including context information of the mobile device from the serving base station to each of the identified plurality of possible target base stations, the context information including an identification of the mobile device;

receive from each of the plurality of possible target base stations an acknowledgment in response to the handoff request, the acknowledgement indicating that at least a portion of the context information has been stored at a respective one of the plurality of possible target base stations and that resources have been reserved at the respective one of the plurality of possible target base stations for the mobile device;

responsive to the received acknowledgements, prioritize the plurality of possible target base stations for the handoff based on predetermined parameters with respect to the plurality of possible target base stations;

initiate the handoff of the mobile device based on the prioritized plurality of possible target base stations; and upon receiving, from one of the prioritized plurality of possible target base stations, an indication of a successfully established connection for the mobile device in response to the initiated handoff, release resources of the serving base station reserved for the mobile device.

17. The article of claim 16, wherein the context information includes a Cell Radio Network Temporary Identifier (CRNTI).

18. The article of claim 16, wherein the functions implemented by the mobile device further comprise functions to:

obtain a measurement report generated by the mobile device, the measurement report including respective signal strengths measured by the mobile device for base stations identified as surrounding base stations with respect to the mobile device; and select the plurality of possible target base stations from among the surrounding base stations identified within the obtained measurement report, based in part on the respective signal strengths of the plurality of possible target base stations from the measurement report.

19. The article of claim 18, wherein the function for selecting the plurality of possible target base stations further includes functions to:

for each of the surrounding base stations identified in the measurement report, determine whether the base station is an available neighboring base station of the serving base station; and identify the plurality of possible target base stations by selecting only those surrounding base stations determined to be available neighboring base stations.

20. The article of claim 19, wherein a list of the available neighboring base stations is stored in a neighbor list at a database that is accessible to the serving base station.

21. The article of claim 20, wherein the function for prioritizing the plurality of possible target base stations further includes functions to:

generate a ranking matrix of parameters with respect to the plurality of possible target base stations, the parameters including the neighbor list and the respective signal strengths of the plurality of possible target base stations from the measurement report;

calculate a ranking value for each of the plurality of possible target base stations based on the parameters in the generated ranking matrix; and generate a priority list of the plurality of possible target base stations ordered in accordance with the respective ranking value calculated for each of the plurality of possible target base stations, wherein the handoff of the mobile device is initiated based on the generated priority list.

22. The article of claim 21, wherein the functions implemented by the mobile device further comprise a function to:

responsive to a received indication of a successfully established connection for the initiated handoff of the mobile device, update the calculated ranking value in the ranking matrix for the neighbor list parameter of the one possible target base station from which the indication was received.

\* \* \* \* \*